UNITED STATES PATENT OFFICE.

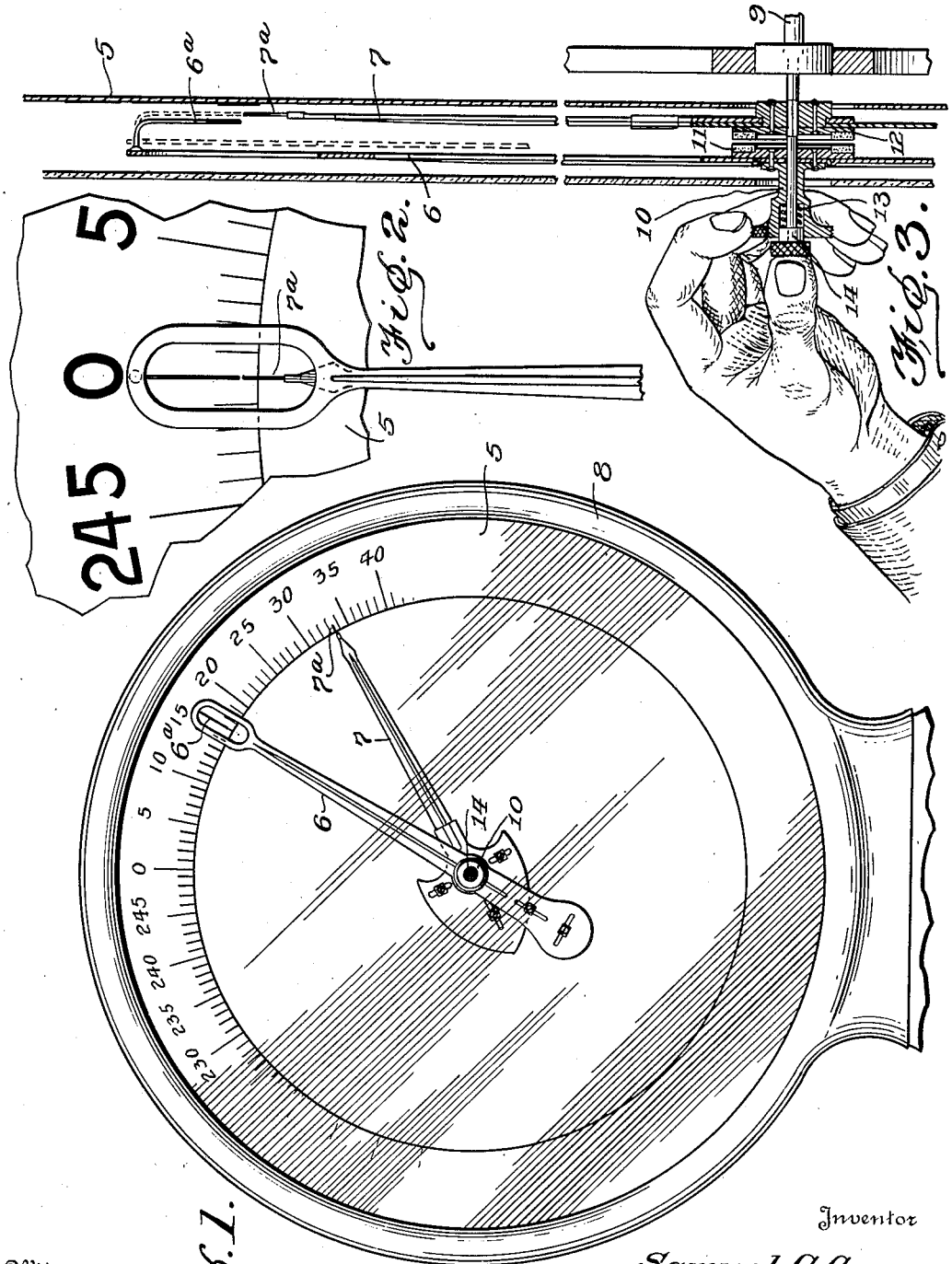

SAMUEL G. CRANE, OF TOLEDO, OHIO, ASSIGNOR TO TOLEDO SCALE COMPANY, OF TOLEDO, OHIO, A CORPORATION OF NEW JERSEY.

INDICATOR FOR WEIGHING SCALES.

1,407,987.  Specification of Letters Patent.  Patented Feb. 28, 1922.

Application filed February 1, 1918. Serial No. 214,817.

*To all whom it may concern:*

Be it known that I, SAMUEL G. CRANE, a citizen of the United States, residing at Toledo, in the county of Lucas and State of Ohio, have invented certain new and useful Improvements in Indicators for Weighing Scales, of which the following is a specification.

This invention relates to indicators for weighing scales. In scales equipped with a plurality of indicator hands, such, for example, as scales for determining tare, net, and gross weights of commodities, there has been a long felt need for a clear and accurate indicating means that will enable the operator to tell at a glance whether or not the several hands are in exact alignment. It is essential for securing correct readings that all the hands start in absolute alignment from the zero indication and that they maintain this alignment at all times that two or more of them are rotating together, while, of course, each of the hands that may be returned to zero must each time be brought into exact alignment therewith.

The primary object of this invention is to provide such an indicating means whereby accurate alignment of several indicating hands can be readily secured, and it can be instantly detected whether one or more of the hands are out of adjustment.

With the above and other objects in view which will more readily appear after the invention is better understood, my invention consists in the novel construction, combination and arrangement of parts hereinafter more fully described and particularly point out in the subjoined claims.

Reference is to be had to the accompanying drawings illustrating a preferred embodiment of my invention and wherein similar reference numerals designate similar parts throughout the several views.

In the drawings:—

Figure 1 is a front elevation of the upper portion of a scale equipped with my improved indicating mechanism;

Figure 2 is an enlarged detail view of the indicating portions of the scale; and Figure 3 is a detail transverse sectional view showing the arrangement of the indicating hands relatively to each other.

Referring to the drawings, the numeral 5 designates the dial of a scale upon which are marked the weight indications or graduations, and 6 and 7 respectively designate a pair of indicator hands which co-operate with the weight indications upon the dial 5 so as to indicate the desired weights of any commodities weighed upon the scale. The dial 5 is suitably supported in position within the housing 8 of the scale and the indicator hand 7 is fixedly mounted upon an indicator shaft 9, which shaft is adapted to carry a pinion adapted to mesh with a movable rack actuated upon movement of the weighing mechanism of the scale.

It is to be understood that the weighing mechanism may be of any approved type and that the connections for driving the indicator shaft 9 therefrom may be of any desired form, various mechanisms well known in the scale art being fully capable of performing the required functions.

Inasmuch as the present invention is not dependent upon any particular form of scale mechanism, no attempt is made in this application to show a complete scale mechanism nor to delineate the action of the scale in its load-offsetting or weighing operations; only so much of the scale mechanism being shown as is necessary to portray the position and operation of the indicator hands forming the claimed invention herein disclosed.

The use of a plurality of indicator hands for determining the tare, net, and gross weights of commodities is well shown in the patent to O. C. Reeves, No. 1,210,204, patented December 26, 1916, and reference is made to this patent for the purpose of explaining the operation and use of the several indicator hands herein shown. It is, of course, to be understood that the showing of two indicator hands is not to be construed as limiting the invention to the use of only two hands, inasmuch as three or more hands can be utilized without departing from the spirit and scope of my invention.

As herein shown, the indicator shaft 9 is formed adjacent its forward extremity with a reduced portion (see Fig. 3) upon which is slidably mounted a sleeve 10 carrying the hub of the indicator hand 6 and also a clutch member 11 adapted, when the sleeve 10 is in its innermost position, to engage the companion clutch face 12 fixed on the hub of the indicator hand 7, which hand is keyed or otherwise rigidly secured to the indicator shaft 9. The sleeve 10 is normally maintained in its innermost position with the clutch faces in contact through the medium of the coil spring 13 arranged between a shoulder on the sleeve and a knob 14 fixed on the forward extremity of the indicator shaft. Thus the normal positions of the two indicator hands are with their clutch faces engaging so as to enable the simultaneous rotation of both hands whenever the indicator shaft 9 is rotated. When, however, it is desired to move the indicator 6 relatively to the indicator 7, which is fixed to the shaft 9, the knob 14 and the forward extremity of the sleeve 10 are grasped by the operator and the sleeve 10 moved to substantially the position shown in Fig. 3. The forward extremity of the sleeve 10 is preferably knurled or otherwise roughened to assist this movement. When the sleeve 10 has been moved forward as shown in Fig. 3, the clutch face 11 is detached from the companion clutch member 12 so that the hand 6 can be rotated relatively to the hand 7 by the turning of the sleeve 10.

Each of the indicator hands 6 and 7 has its indicating portion arranged so as to facilitate the operator both in reading the chart indication shown by either hand and also in determining instantly whether or not the two hands are in alignment. As herein shown, the fixed hand 7 terminates in a reduced indicating portion 7ª which may preferably take the form of a needle indication having its terminal portion marked with a color contrasting with that of the remaining portions of the indicator hand. Similarly, the hand 6 is arranged with its indicating portion of reduced area and with that portion adjacent the reading line of the dial marked with a contrasting color. It will be evident that if the reduced portions of each indicator hand are aligned that the hands themselves are in exact alignment and the terminal portions being marked with contrasting colors facilitate this reading. An even greater help to this reading, however, is the arrangement now to be described, wherein the two indicating portions of the hands are arranged in the same vertical plane parallel to the dial. To accomplish this the indicating portion of one hand is bent and extended a sufficient distance from the plane of such indicator hand as to bring it into the plane of the indicating portion of the other hand. As herein shown, the needle indicating portion 6ª of the hand 6 is extended rearwardly and then bent so that the terminal portion thereof will lie in exactly the same plane parallel to the dial as the terminal portion 7ª of the indicating hand 7 (see dotted lines in Fig. 3). This construction brings the two needle indications in close proximity to each other in the same plane and only a glance is required to determine whether or not the two indicating portions are in alignment.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a weighing scale and in combination with the dial thereof, a plurality of separately movable indicator hands having their indicating portions arranged in the same vertical plane parallel to the plane of the dial, and means for normally connecting said hands to the weighing mechanism of the scale.

2. In a weighing scale and in combination with the dial thereof, a plurality of separately movable indicator hands having their indicating portions arranged in the same vertical plane parallel to the plane of the dial, means for normally connecting said hands to the weighing mechanism of the scale, and means whereby one of the hands may be moved relatively to the other.

3. In a weighing scale and in combination with the dial thereof, a plurality of separately movable indicator hands, one or more of which are movable relatively to the other or others, and means for normally connecting said hands to the weighing mechanism of the scale, the several hands having their indicating portions arranged in the same vertical plane parallel to the plane of the dial.

4. In a weighing scale and in combination with the dial thereof, a plurality of separately movable indicator hands, one or more of which are movable relatively to the other or others, the several hands having their indicating portions arranged in the same vertical plane parallel to the plane of the dial, means for normally connecting said hands to the weighing mechanism of the scale, and means whereby the indicating portion of one hand is moved out of said plane when the hand is moved relatively to the other or others.

5. In a weighing scale and in combination with the dial thereof, a pluarlity of separately movable indicator hands having their indicating portions reduced and arranged in the same vertical plane parallel to the plane of the dial, and means for normally connecting said hands to the weighing mechanism of the scale.

6. In a weighing scale and in combination with the dial thereof, a plurality of separately movable indicator hands having their indicating portions formed with elongated reduced members arranged in the same vertical plane parallel to the plane of the dial, and means for normally connecting said hands to the weighing mechanism of the scale.

7. In a weighing scale and in combination with the dial thereof, a plurality of separately movable indicator hands having their indicating portions formed with needle indicators arranged in the same vertical plane parallel to the plane of the dial, and means for normally connecting said hands to the weighing mechanism of the scale.

8. In a weighing scale and in combination with the dial thereof, a plurality of separately movable indicator hands having their indicating portions reduced and so disposed relatively to each other as to normally align to form a single reduced indicator parallel to the dial, and means for normally connecting said hands to the weighing mechanism of the scale.

9. In a weighing scale and in combination with the dial thereof, a plurality of indicator hands having their indicating portions reduced and so disposed relatively to each other as to normally align to form a single reduced indicator, means for normally connecting said hands to the weighing mechanism of the scale, and means for maintaining this aligned indication when the hands are rotated, such means permitting the turning of one or more of the hands relatively to the other or others.

10. In a weighing scale and in combination with the dial thereof, a plurality of indicator hands arranged in different vertical planes parallel to the dial and having their indicating portions arranged to normally align in the same vertical plane parallel to the dial, and means for normally connecting said hands to the weighing mechanism of the scale.

11. In a weighing scale and in combination with the dial thereof, a plurality of indicator hands arranged in different vertical planes parallel to the dial and having their indicating portions arranged to normally align in the same vertical plane parallel to the dial, the terminals of the indicating portions being reduced and marked with contrasting colors, and means for normally connecting said hands to the weighing mechanism of the scale.

12. In a weighing scale and in combination with the dial thereof, a plurality of indicator hands arranged in different vertical planes parallel to the dial, the indicating portion of one of said hands remaining in the plane of its hand and the indicating portions of the other hand or hands extending into alignment with the indicating portion of the first-mentioned hand and in the same plane therewith, and means for normally connecting said hands to the weighing mechanism of the scale.

13. In a weighing scale and in combination with the dial thereof, a pair of indicator hands arranged in different planes parallel to the dial, the indicating portion of one of said hands extending into the plane of and normally aligning with the indicating portion of the other hand, and means for normally connecting said hands to the weighing mechanism of the scale.

14. In a weighing scale and in combination with the dial thereof, a pair of indicator hands arranged in different planes parallel to the dial, the indicating portion of the hand farthest removed from the dial extending rearwardly to the plane of the indicating portion of the other hand and having its terminal portion arranged in such plane.

15. In a weighing scale and in combination with the dial thereof, a pair of indicator hands arranged in different planes parallel to the dial, the indicating portion of the hand farthest removed from the dial extending rearwardly to the plane of the indicating portion of the other hand and having its terminal portion arranged in such a plane, the terminal portions of the indicator hands being disposed adjacent to each other and marked with contrasting colors.

SAMUEL G. CRANE.

Witnesses:
F. A. CROWLEY,
H. H. LYBRAND.